Sept. 1, 1953  H. C. WENDT  2,651,010
HARMONIC ERROR COMPENSATOR
Filed May 16, 1951  4 Sheets-Sheet 1
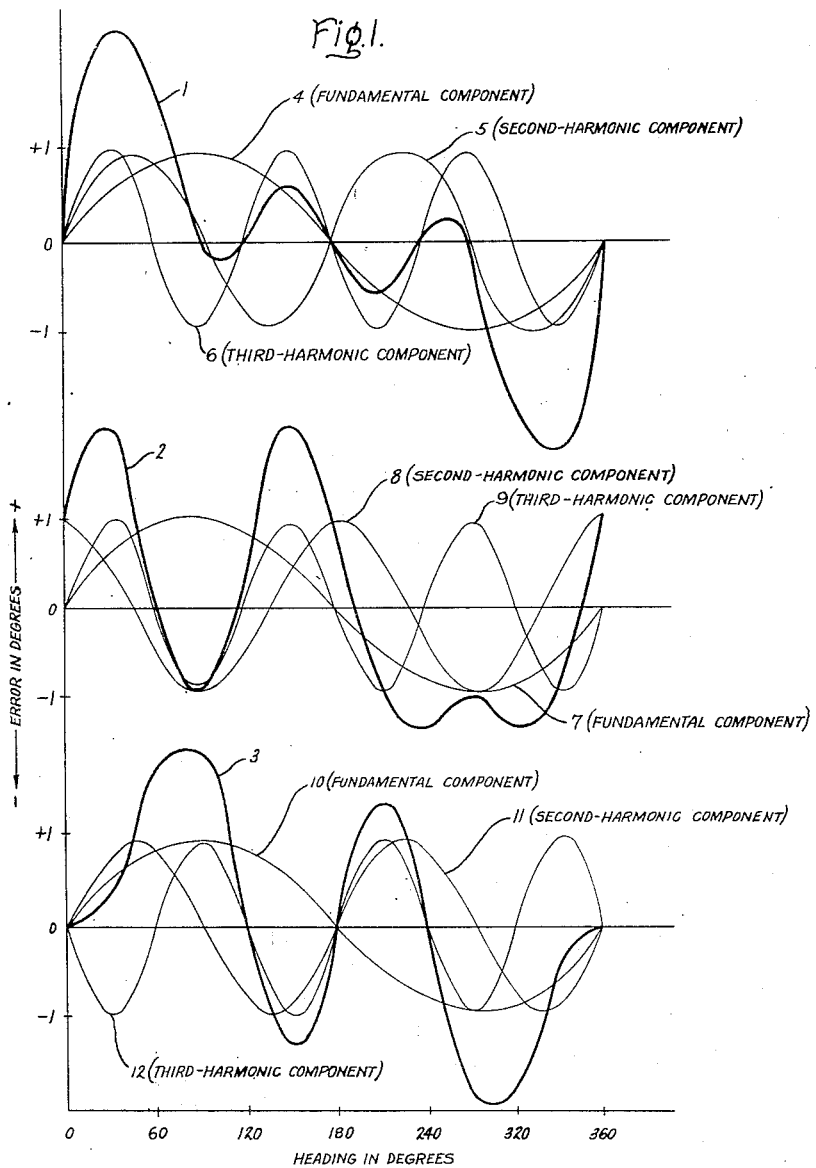
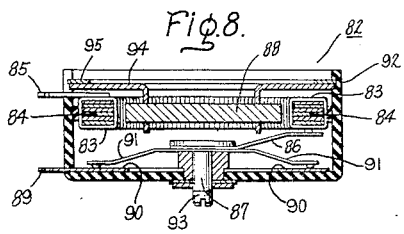
Inventor:
Harry C. Wendt,
by Russell A. Warner
His Attorney.

Sept. 1, 1953            H. C. WENDT            2,651,010
HARMONIC ERROR COMPENSATOR
Filed May 16, 1951            4 Sheets-Sheet 2
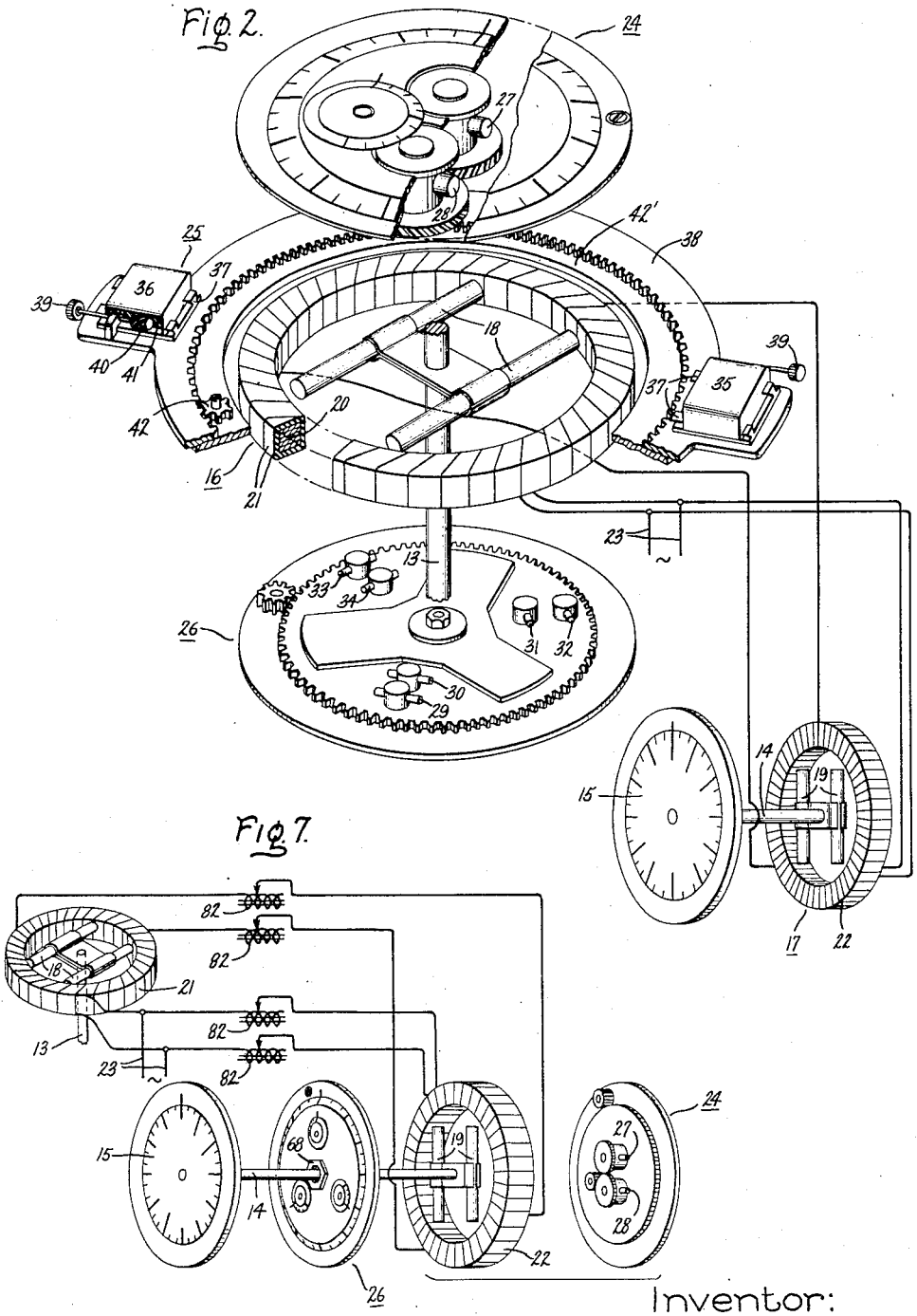
Inventor:
Harry C. Wendt,
by Russell A. Warner
His Attorney.

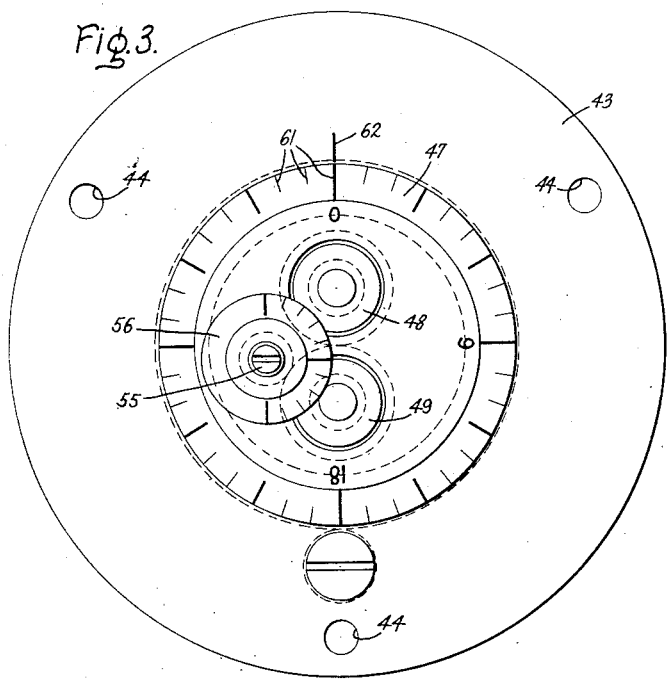
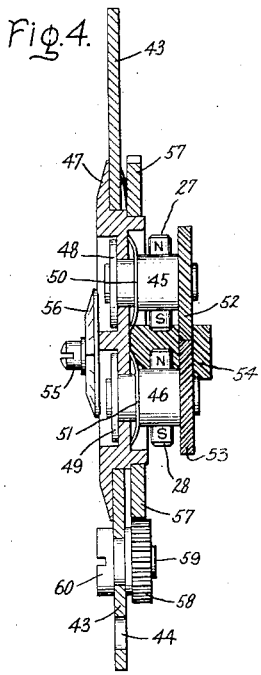
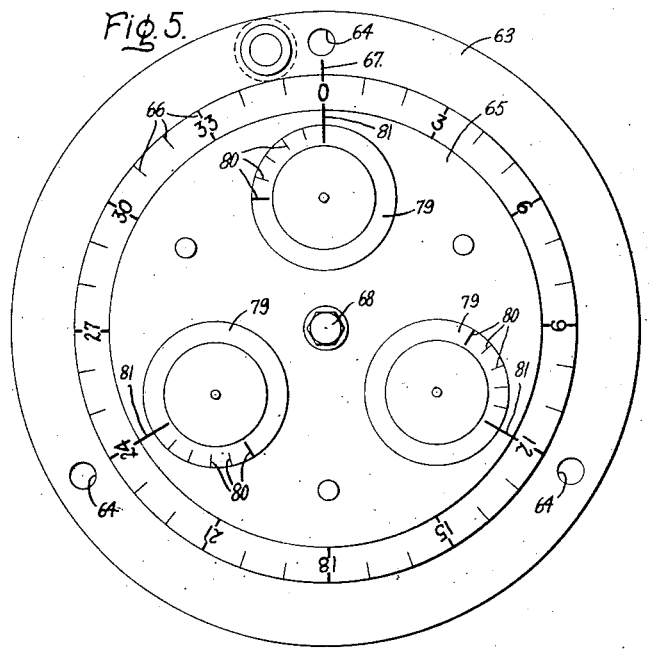
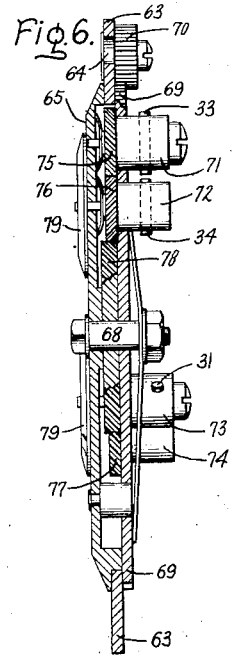

Sept. 1, 1953 H. C. WENDT 2,651,010
HARMONIC ERROR COMPENSATOR
Filed May 16, 1951 4 Sheets-Sheet 4
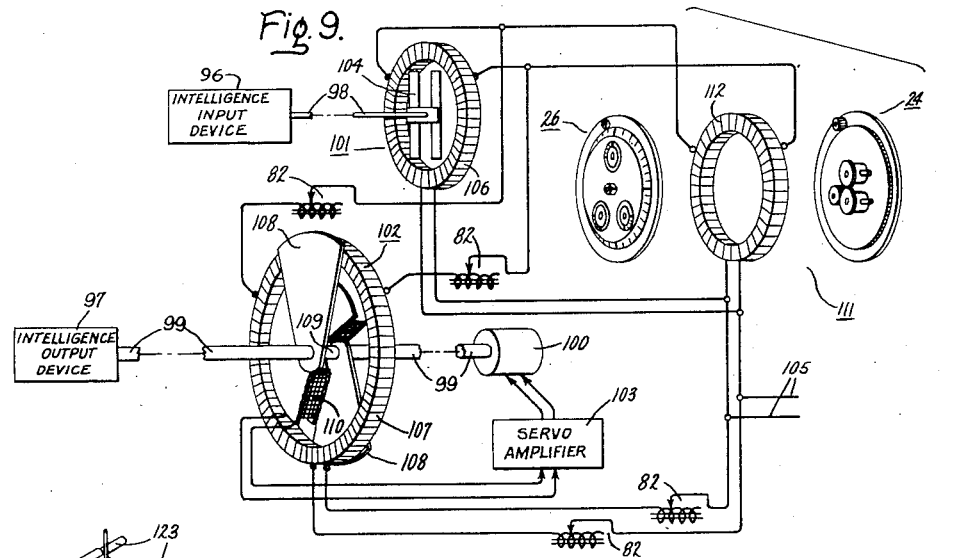
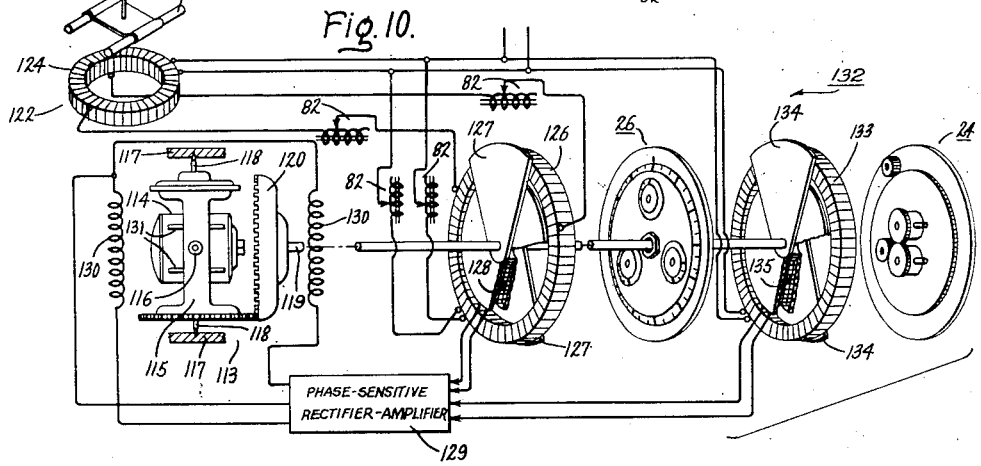
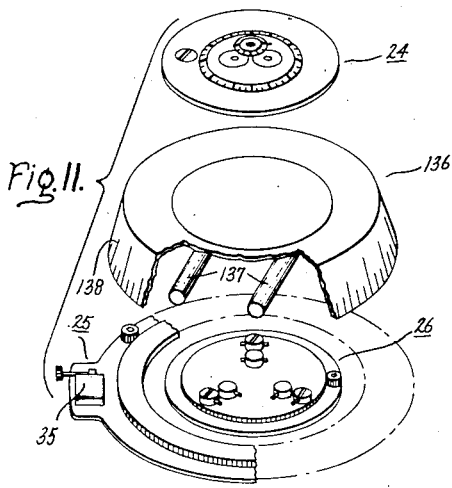
Inventor:
Harry C. Wendt,
by Russell A. Warner
His Attorney.

Patented Sept. 1, 1953

2,651,010

UNITED STATES PATENT OFFICE 2,651,010

HARMONIC ERROR COMPENSATOR

Harry C. Wendt, Nahant, Mass., assignor to General Electric Company, a corporation of New York Application May 16, 1951, Serial No. 226,635

30 Claims. (Cl. 318—24)

1

The present invention relates to indicators and telemetering and control arrangements, and, more particularly, to improved magnetic compasses and telemetering and control systems wherein errors are minimized.

In electrical circuit arrangements wherein a predictable error in a certain intelligence signal occurs, it is known that compensation therefor may be achieved by the insertion of an appropriate corrective signal having predetermined characteristics such that the combined intelligence and corrective signals will produce substantially the same results which obtain from the intelligence signal alone if it were without error. Likewise, in telemetering and control systems wherein rotatable electrical transmitter and repeater units are employed, it has been known to inject voltages or fluxes into the systems at a plurality of intervals or stations corresponding to every few degrees of angular orientation of the transmitter or repeater unit to compensate for the errors of both mechanical and electrical origin existing at each of these points. Perhaps the most familiar of compensating structures utilized in electro-mechanical systems to minimize output indication errors are those permanent magnet or electromagnet arrangements placed in the vicinity of magnetic compasses to correct for the effects of stray magnetic fields near the compasses.

It is characteristic of known compensators that the errors existing at each point of a rotatable member's orientation, that is, the divergence of a rotatable member from its theoretically correct angular position at each point, is corrected by means which provide, at each of these points, a restoring effect proportional to the actual errors existing there. For example, in the multiple station signal or flux injecting systems, the characteristics of signals or fluxes introduced at each station are established to overcome the known error. Such systems are described in the Patent No. 2,519,058, issued August 15, 1950, for a "Deviation Compensator," and in the Patent No. 2,570,826, issued October 9, 1951, for an "Error Compensator," both of which are assigned to the same assignee as that of the present application. Compensation in magnetic compass units is of a similar nature in that the magnetic fields in the vicinity of the compass are distorted by a compensator unit in a pattern which results in coercion of the compass magnets to substantially the theoretically correct positions, the compensator unit being designed such that this field pattern is opposite in effect to the pattern of the stray field producing the errors at various points.

The present invention is particularly advantageous in accomplishing correction of errors in devices and systems which translate the angular motion of a member into an output of intelligence. One application of error compensation of this nature is in a magnetic compass wherein the angular orientations of the compass magnets are mechanically translated into orientations of a compass card or are electrically translated into orientations of a remote indicator dial or into remote orientations of a magnetic field in a telemetering arrangement. Further applications are made in electrical telemetering units themselves, wherein angular movements of the transmitter rotor are translated into mechanical, electrical or magnetic intelligence outputs at the receiver. In accordance with this invention, errors, in angular motion translating arrangements such as a magnetic compass, a telemetering system including a transmitter or receiver, or a compass controlled directional gyroscope or other systems incorporating an electrical differential detector arrangement, are reduced to negligible values by a maximum of three individually and independently adjustable compensator structures, each of which provides a pattern of compensation for errors which is a harmonic component of the over-all pattern of errors in the arrangement being corrected. It has been determined that the patterns of random variations in errors of any rotating or angular motion translating systems such as the foregoing may be expressed as essentially the first, second and third harmonic components thereof, the phase and amplitude relationships of these harmonics being unique for each error pattern. By providing compensator structures which produce the requisite pattern of error compensation corresponding to each of the first, second and third harmonic components of any over-all error pattern, system errors are reduced to insignificant values.

As will appear in detail hereinafter, compensation may thus be secured with simply built and readily adjustable structures which may be utilized in any system of the above types and which permit an exceptionally high degree of system accuracy to be realized.

Therefore, it is one object of the present invention to minimize errors in devices and systems wherein intelligence output is derived in response to motion of a movable member in relation to magnetic fluxes.

A second object is to provide new and improved compensator arrangements for minimizing errors in magnetic compass and telemetering and control systems.

Another object is to provide error compensator arrangements wherein system errors are corrected by independently adjustable compensator structures each compensating for one harmonic component of the over-all system error.

Further, it is an object to provide compensator devices which compensate for the first, second and third harmonic components of the error patterns in magnetic compass and electrical telemetering and control systems.

These and other objects and features of the subject invention are disclosed in detail in the following description wherein reference is made to the accompanying drawings, in which:

Fig. 1 depicts the first three harmonic components of three typical error patterns for which compensation is achieved by the present invention;

Fig. 2 illustrates pictorially one embodiment of an electrical telemetering system provided with harmonic error compensation;

Figs. 3 and 4 are, respectively, plan and cross-sectional side views of a first-harmonic error compensator;

Figs. 5 and 6 are, respectively, plan and cross-sectional side views of a third harmonic error compensator;

Fig. 7 shows, partially in schematic and partially in pictorial form, an electrical transmitter and receiver arrangement wherein error compensation of the receiver unit is accomplished;

Fig. 8 is a cross-sectional view of a second harmonic reactance-type compensator;

Fig. 9 represents a control system including a compensation system associated with an electrical differential detector unit;

Fig. 10 illustrates a compass controlled directional gyroscope system wherein another embodiment of a compensator system is associated therewith; and Fig. 11 depicts a magnetic compass compensated in accordance with the present invention.

There are plotted, in Fig. 1, three curves, 1 through 3, of the error in degrees of the angular position of a rotatable member in an angular motion reproducing system versus the angular heading of this rotatable member throughout one complete revolution. These curves are representative of the erratic variations in error which may obtain in any of such systems, although they in fact depict errors existing in a compass controlled directional gyroscope system wherein compensation such as that provided by the subject invention is particularly advantageous. As has been earlier mentioned herein, error curves having random characteristics such as those illustrated by plots 1, 2 and 3 have been found by Fourier analysis, to be very closely approximated by the first, second and third harmonic components thereof. That is, each random error curve may be considered to be essentially the summation of three error curves which have substantially sinusoidal distributions and which have periods which are 360, 180, and 120 degrees respectively, of the complete 360 degree rotation in the system measured. Thus, in Fig. 1, error curve 1 may be analyzed as being very closely approximated by the summation of curve 4, the fundamental component, curve 5, the second harmonic component, and curve 6, the third harmonic component, the amplitudes and phase relationships being self-evident from the plots. Error curve 2 is resolved into first, second and third harmonic components, 7, 8 and 9, respectively, the resultant error curve 2 differing from curve 1 primarily as a result of a shift in phase of the second harmonic component, 8, from its relationship with the other harmonics which bear the same phase relationships as in the previously considered case. Similarly, the error curve 3, resolved into first, second and third harmonic components 10, 11 and 12, respectively, is different in form from that of error curve 1 in that the third harmonic component 12, is displaced in phase from its relationship with the other harmonics which bear the same relationships as those contributing to the makeup of curve 1.

The foregoing consideration is important to an understanding of this invention for the reason that error compensation is achieved not by compensating for the absolute value of error at each point but by compensating for each of the first three harmonic components with a separate compensating structure. An error distribution such as that of curve 1 in Fig. 1 for example is effectively minimized to the point of being negligible by a first harmonic compensator which introduces a distributed correction of the same amplitude as plot 4 but of opposite phase, by a second harmonic compensator which introduces a distributed correction of the same amplitude as plot 5 but of opposite phase, and by a third harmonic compensator which introduces a distributed correction of the same amplitude as plot 6 but opposite phase. Error curves 2 and 3 are similarly compensated. As will be made evident in detail hereinafter, the harmonic components of any error curve in systems of the character to which this invention is particularly applicable may be compensated with a high degree of accuracy by means of devices which are relatively simple to construct and operate, which are independently adjustable to permit variation of the phases and amplitudes of the compensation distributions afforded thereby, and which are adaptable and interchangeable for use in numerous systems which are to be error compensated.

Advantageous utilization of the compensation method and means which is the subject of this invention, though not limited thereto, is illustrated in connection with an electrical telemetering arrangement in Fig. 2. The angular orientation of input shaft 13 in this system is reproduced at a remote position by output shaft 14, and may be indicated by a dial structure such as that indicated by numeral 15. The electrical telemetering employed to accomplish this repeating action is shown to comprise the transmitter 16 and repeater or receiver 17, each of these units including a stator having an angular core member on which is mounted a toroidal winding tapped at a plurality of points, these windings having their corresponding taps electrically interconnected. Rotable shafts 13 and 14 are coupled to permanent magnet structures 18 and 19 respectively, which serve as the rotors for the transmitter 16 and receiver 17. Representation of the input shaft orientation by the angular position of output shaft 14 is accomplished by the flow of second harmonic currents generated in the transmitter to the receiver where unidirectional diametric magnetic fluxes are established across the receiver stator, the receiver rotor structure being coerced into alignment with the diametric fluxes. Second harmonic electrical telemetering systems of this type have long been well known. The transmitter core 20 and the corresponding receiver core, not shown, are constituted of highly permeable magnetic material, and the windings 21 and 22, respectively, are electrically interconnected at corresponding 120 degree points about the peripheries thereof and are energized at their ends through leads 23 coupled with a source of periodically varying current. Transmitter magnet structure 18, which is rotatable with shaft 13 and is angularly oriented by means not illustrated, establishes unidirectional flux in the two halves of core 20 which interacts with the alternating fluxes produced therein by winding 21 to induce voltages in the tapped sections of winding 21 which are second harmonics of the fundamental frequency exciting current carried by input leads 23. These second harmonic voltages are impressed across the corresponding tapped portions of the receiver winding 22 and, in the absence of excitation of winding 22 from leads 23, would create an alternating diametric flux at the receiver which is in coresponding angular alignment with the angular orientation of the transmitter magnet structure 18. However, the fundamental frequency excitation of receiver winding 22 from leads 23 creates fundamental flux which increases the flux density of the core of winding 22 during both its positive and negative half-cycles. The phase relationship between this excitation flux and the second harmonic currents flowing in the receiver winding is such that second harmonic current half-cycles of one polarity produce little flux through the receiver core while the other half-cycles produce sizeable fluxes. This results in a pulsating diametric flux of one net polarity being established across the receiver coil diameter, and the receiver magnet structure 19 aligns itself with this diametric flux to duplicate the position of the transmitter magnet structure.

Although theoretically the input and output shafts 13 and 14 in Fig. 2 should be in angular correspondence, it should be appreciated that errors of mechanical, electrical and magnetic origins prevent highly accurate reproduction of intelligence from being realized. Considering the system of Fig. 2 to depict a magnetic compass transmitter and repeater, wherein transmitter magnet structure 18 either includes the compass magnets themselves or is slaved or coupled for angular positioning with such magnets, not shown, the curve of system errors, that is, the plot of divergences between the azimuth readings on output dial 15 and the actual azimuth orientations of the craft on which the system is mounted, will be found to resolve itself into or be closely approximated by predominantly the first three harmonic components thereof. It is believed that of the total system errors, the fundamental component, or those errors which have one cycle of variation for 360 degrees rotation of the input and output shafts, may be occasioned by magnet or polarized attractions, certain reluctance effects, and weight balance conditions of the rotatable members. Two cycles of variations for 360 degrees rotation of the shafts, that is, the second harmonic component of the system errors, are believed to result from interaction between the magnetic fields and soft iron, alternating flux and magnets or magnetic material, and from other reluctance effects. The third harmonic component is believed due primarily to intereaction between magnetic fields, magnets and soft iron, and reluctance effects attributable to the distribution of the turns of the transmitter and receiver windings.

Compensators for each of the first, second and third harmonic components of the error in the system of Fig. 2 are designated by numerals 24, 25 and 26, respectively, and are illustrated in association with the transmitter unit 16. By means of structure which is illustrated in greater detail in Figs. 3 and 4, and the explanation of which is reserved for later consideration of these figures, the two cylindrical permanent magnets 27 and 28 in fundamental compensator 24 are rotatable with respect to one another and are also rotatable as one unit about an axis which is substantially aligned with the transmitter or input shaft 13. The relative angular movements of magnets 27 and 28 permits the achievement of a resultant magnetic field therefrom which may be of any magnitude from a negligible value, when their fields are in opposition, to a maximum when their fields are oriented to be wholly additive. Rotation of the pair of magnets as a unit positions the resultant field thereof such that it may extend diametrically across the transmitter core and winding at any desired angular orientation. The resultant magnetic field from compensator 24 acting diametrically across the core and winding of transmitter 16 may be considered responsible for the production of a diametric unidirectional field in the corresponding angular position at the receiver 17, and the angular position of the receiver magnet structure 19 at any time is in alignment with the resultant between this compensator field and the diametric field established in accordance with the position of the transmitter magnet structure 18. For one complete revolution of the transmitter magnet structure 18, therefore, the receiver magnet structure 19 will be angularly displaced from the theoretically correct positions such that the magnitude and angular sense of these displacements follow a pattern which is substantially sinusoidal and has one cycle of variation for the one revolution. If the transmitter magnet structure 18 is not rigidly held by shaft 13 and is, for example, the sensing element of a magnetic compass, then the field from compensator 24 also acts directly on the magnet structure 18 itself to displace it in accordance with the same general one-cycle pattern, and the over-all fundamental compensation is a combination of effects of both of these types. The amplitude of the fundametal compensation is adjusted by varying the relative angular positions of magnets 27 and 28, and the phase of this compensation with respect to the rotating members is adjusted by rotating the magnets, as a unit, with reference to the transmitter stator assembly, that is, the core 20 and winding 21.

Compensation for the third harmonic component of error by the compensator unit 26 in the system of Fig. 2 is also achieved by adjustment of the fields created by permanent magnets. For this purpose there are provided three pairs of relatively small rod-shaped permanent magnets, 29 and 30, 31 and 32, and 33 and 34. The magnets of each pair are relatively rotatable, such that the magnitude of their resultant fields may be varied, and the pairs of magnets are positioned such that they lie in substantially one plane which is perpendicular to the axis of input shaft 13 and such that they are equally spaced radially from the axis of shaft 13 and angularly spaced 120 degrees from one another about this same axis. In addition to the relative movement of the magnets of each pair, the pairs of magnets are rotatable, as a unit, about the central axis of the compensator 26 which is coincident with the axis of transmitter input shaft 13. Figs. 5 and 6 depict in detail the mechanisms involved to accomplish the foregoing movements, and discussion thereof is contained hereinafter in connection with a consideration of these figures.

Operation of the third harmonic compensator unit is in certain respects similar to that of the fundamental compensator previously described. The magnetic field from the magnet pairs are disposed to thread the transmitter core and coil at 12 degree positions and thus effect the production of corresponding unidirectional fluxes at the receiver, whereupon the receiver magnet structure 19 tends to align itself with the resultants of the compensating and the main diametric fields at the receiver. Since the compensating fields at the receiver are spaced at 120 degree positions about the receiver core and coil, the receiver magnet structure will alternately lead and lag the theoretically correct angular orientations thereof three times in any one complete revolution thereof and with substantially sinusoidal variations. In those arrangements wherein the transmitter magnet structure is not rigidly restrained, as where the transmitter magnet structure 18 is the sensing element of a magnetic compass, the three pairs of magnets will also have a direct compensating influence upon the transmitter magnet structure 18, whereupon the resulting third harmonic component compensation is a combination of both the direct interactions between magnets and the distortions of the diametric fields at the receiver unit.

The means for establishing second harmonic component compensation in the system of Fig. 2 includes soft iron members 35 and 36 which are adjustable in the compensator unit 25. Soft iron in the vicinity of magnets creates distortions of the fields thereof by causing flux to crowd through the low reluctance path afforded by such material rather than through the air or other matter near the magnets. Either one of the soft iron members 35 and 36 alone will serve to deflect the field from the transmitter magnet structure 18 such that, for one revolution of the magnets, the transmitter core and winding will be acted upon by a distorted field which leads and lags the undistorted field twice and with substantially sinusoidal variations. The diametric field followed by the receiver magnets 19 corresponds, in angular orientation, to that of the corrected transmitter field and is therefore compensated for the second harmonic component of error.

Two small soft iron members, diametrically opposite one another, are preferred to effect the field distortions or deflections which accomplish the second harmonic compensation. The amplitude of the compensation pattern produced by the second harmonic unit 25 may be varied by changing the radial distance between the soft iron members 35 and 36 and the axis of the transmitter shaft 13, thus emphasizing or reducing the distorting effects; and the phase relationship between the angular orientations of the input shaft 13 and second harmonic compensation is adjustable with the angular positioning of soft iron members about the axis of shaft 13. Accordingly, provision is made in the unit 25 to vary these amplitude and phase characteristics. Soft iron members 35 and 36 are arranged to be radially slidable on tracks 37 affixed to the angular mounting plate 38, the sliding movements being accomplished by the manipulation of knobs 39 which rotate the gears 40 in mesh with rack gears 41. Annular mounting plate 38 is shown to be provided with gear teeth on its inner edge, and these teeth engage the small gear 42 on the stationary support such that rotation of gear 42 by any suitable manually operated means causes mounting plate 38 and the soft iron members 35 and 36 thereon to be rotated about the axis of input shaft 13. When knobs 39 are turned to force the soft iron members 35 and 36 radially inward, the amplitude of the second harmonic component of compensation increased, and, a shift in phase of such compensation is accomplished by rotation of gear 42 to vary the angular positions of the soft iron members about the axis of shaft 13.

A preferred construction of a fundamental component compensator such as that shown at 24 in Fig. 2 is illustrated in detail in Figs. 3 and 4, which are, respectively, a plan and partly sectionalized side view taken along the central axis. Stationary mounting plate 43 supports the entire assembly for positioning the bar magnets 27 and 28, and is affixed to the unit to be compensated by bolts (not shown) passing through the openings 44. Magnets 27 and 28 are fitted into diametric holes in cylindrical studs 45 and 46 which are each rotatably mounted, at one end, in a circular dial plate 47 which is positioned in a central circular opening in the mounting plate 43. Washers 48 and 49 and leaf springs 50 and 51 maintain studs 45 and 46 in the desired positions. At the other ends of the studs 45 and 46 there are affixed gears 52 and 53, respectively, which mesh with one another, the separation between the studs and the diameter of these gears being such that bar magnets 27 and 28 do not interfere with each other when both studs are rotated through 360 degrees. One of the gears 53 meshes with and is driven by the gear 54 which is also rotatably mounted on dial plate 47 and has a slotted head 55 on its shaft on the other side of plate 47 to receive a tool such as a screwdriver for producing rotation of gear 54, the meshed gears 52 and 53, studs 45 and 46, and the opposite angular motion of bar magnets 27 and 28. A small circular dial plate 56, with indicia thereon cooperating with an index on dial plate 47, is also affixed to the shaft to which gear 54 is attached, whereby the angular positions of magnets 27 and 28 may be indicated. Annular gear 57 is fixed to dial plate 47 on the under side of plate 43, and this gear meshes with a small circular gear 58 rotatably mounted on plate 43 and rotatable with the shaft 59 which has a slotted head 60 accommodating a screwdriver or other tool. Rotation of gear 58 causes rotations of the movable dial plate 46 and the bar magnets 27 and 28 as a unit, to vary the phase of the fundamental compensation, which phase may be indicated by indicia 61 on dial plate 47 cooperating with index 62 on the mounting plate 43.

Figs. 5 and 6 depict a plan and sectionalized side view, respectively, of a third harmonic component compensator such as that portrayed in the system of Fig. 2. Mounting plate 63, provided with openings 64 for mounting bolts, also has a large central circular opening in which is positioned a rotatable circular dial plate 65 provided with indicia 66 cooperating with an index 67 on mounting plate 63. A central shaft 68 rigidly couples plate 65 with a circular gear 69 disposed rearwardly of the mounting plate 63 and meshed with a smaller gear 70 rotatably positioned on plate 63. Rotation of gear 70 by means of a tool such as a screwdriver thus also accomplishes rotation of gear 69 and dial plate 65 about the longitudinal axis of shaft 68. Three pairs of bar magnets are supported by the dial plate 63, these pairs being angularly spaced by 120 degrees from one another about the axis of shaft 69. Each of the permanent magnets, such as magnets 33, 34 and 31 visible in Fig. 6, is positioned in a diametric opening in a cylindrical nonmagnetic stud, the pairs of studs 71 and 72 and 73 and 74 being illustrated for two pairs of the magnets, and the studs of each pair being radially spaced from the shaft 68. Relative rotation of the magnets in each pair is made possible by the provision of a gear attached to each of the studs, such as gears 75, 76 and 77 attached to studs 71, 72 and 74, affixed to the shaft 68. The two gears of each pair of studs are meshed, and the inner gear is in turn engaged with the central gear 78. Therefore, when any one of the studs, as, for example, 71, is rotated by a screwdriver received in an appropriate slot, all of the other studs are caused to rotate proportionally, and such rotations are in opposite angular directions for the two studs and magnets of each pair thereof. Dials 79, rotatable with one of the magnets of each pair, provide indication of the relative angular orientations of the magnets by the indicia 80 cooperating with the indices 81 on dial plate 65.

Each compensator unit is constructed of nonmagnetic materials, except that there are, of course, permanent magnets in the first and third harmonic component compensators and at least one soft iron element in the second harmonic component compensator, as hereinbefore explained.

The electrical telemetering arrangement of Fig. 7 is essentially the same as that illustrated in Fig. 2, except that harmonic error component compensation is achieved in part at the receiver unit and in part by means inserted in the leads electrically interconnecting the transmitter and receiver units. For convenience of description, those elements of the system of Fig. 7 which are the same as those of Fig. 2 are identified by the same numerals. Thus the movements of input shaft 13 and magnet structure 18 are translated into movements of output shaft 14 and indicator dial 15 and magnet structure 19 by the generation of currents in transmitter winding 21 which are a second harmonic of the frequency of current applied to the supply leads 23 and the passage of such currents to the receiver winding 22 through the electrical interconnections between these windings. Fundamental and third harmonic error component compensation is provided by fundamental compensator unit 24 and third harmonic compensator 26 which produce effects corresponding to those discussed in connection with the system of Fig. 2. Third harmonic component compensator 26 differs from the structure showing in Figs. 5 and 6 only in that the central shaft 68 is hollow to permit the output shaft 14 to pass therethrough to the output indicating dial 15.

Second harmonic component compensation is accomplished by electrical reactance devices in the system of Fig. 7, rather than by soft iron elements as provided in the arrangement of Fig. 2. These reactance devices, 82, are represented in series with each of the electrical interconnections between the taps on transmitter and receiver windings 21 and 22. As is well known, the second harmonic voltages at each of the taps on the receiver winding 22 will not be equal to the corresponding voltages at the corresponding taps on the transmitter winding 21 whenever the receiver magnet structure 19 is not in angular coincidence with the transmitter magnet structure 18, whereupon currents flow between the transmitter and receiver through the electrical interconnections, and the second harmonic currents thus caused to flow in the sections of the receiver winding 22 produce a resultant unidirectional field across the annular receiver winding 22 which coerces the receiver magnet into angular correspondence with it and the transmitter magnet structure 18. It has been found that when variable reactance devices 82 are inserted in the lines interconnecting the transmitter and receiver windings, and appropriate adjustments of the values of such reactances are made, the receiver magnet structure 19 may be caused to alternately lead and lag the angular position of the transmitter magnet structure twice during one complete revolution of the latter magnet structure, and in a substantially sinusoidal manner. By appropriate phasing of this lead and lag phenomenon with respect to the second harmonic component of error in the system, this component of error is reduced to a negligible value. When a reactance is inserted in any one lead of a three-wire system such as that of Fig. 7, it is found that the diametric field at the receiver is caused to lead and lag the angular position of the transmitter rotor twice during one complete revolution and in a substantially sinusoidal fashion, the amplitude of such variations being dependent upon the magnitude of the reactance. The pattern of such variation at the receiver has a zero or null point at the position of the tap for the lead having the reactance therein, that is, the sinusoidal variation is in phase with the tap position. When a reactance is also inserted in another one of the three tie lines, a similar pattern of variations in the orientations of the receiver diametric field is produced, and the resultant of these two sets of sinusoidal variations phased 120 degrees apart is one pattern of variations alternately leading and lagging twice in the 360 degrees and phased somewhere between the 120 degree positions of the two sets of variations of which it is the resultant. The exact phase of this resultant, between the taps connected to the reactances, may be established by adjusting the relative magnitudes of the two reactances. Thus, when the resultant is to be phased to have a null exactly midway between the taps, the reactances are made equal, and, when the null is to be near one tap, the reactance in the line connected to that tap is made larger than the other reactance. Although the three intercouplings between transmitter winding 21 and receiver 22 are shown to include reactances 82, it should be clear that only those in two of the couplings are used to produce the desired compensation, the third being reduced to zero or set to a minimum reactance value. When the correct phasing of the second harmonic component of compensation with respect to the receiver winding 22 has been determined by experiment and calculation, then those reactances coupled to the two tapped positions between which the zero position of the compensating wave lies are adjusted and the remaining reactance set to a minimum. The magnitude of the reactances controls the amplitude of the compensation, and the relative magnitudes of the reactances control the phasing, as stated before. In this discussion, the two tie lines interconnecting the ends of windings 21 and 22 are considered as one, electrically, and the same is true of the reactances in these lines.

A preferred embodiment of a reactance unit for the previously described second harmonic component compensator arrangement appears in an axial cross-section in Fig. 8. An open-ended reactance winding 83 is wound in toroidal form about the annular iron core 84 and is electrically connected at one end to the terminal 85. Variable tapping is achieved by the leaf spring contact member 86 which is rotatable with the shaft 87 and which bears against the underside of winding 83, this portion of winding 83 being free of insulation to provide good electrical contact with the member 86. A rod-shaped permanent magnet 88 is disposed diametrically with respect to the annular core 84, providing a magnetic bias for the core such that it operates at a point on its saturation curve which is appropriate for the frequencies and voltages of signals which the reactance unit must handle. Terminal 89 is an extension of an annular contact plate 90 which makes sliding contact with the leaf spring arms 91 attached to the rotatable shaft 87 and in electrical connection with the contact member 86. All of the elements of unit 82 are supported within a hollow cylindrical casing 92 which is closed at one end, shaft 87 being centrally mounted on that end and projecting therethrough such that the head 93 thereof may be rotated by suitable means, such as a screwdriver. The core 84 with its winding 83 is positioned coaxially with the casing a short distance from the closed end thereof and affording space for rotative movement of contact arms 86 and 91. Permanent magnet 88 is held in position by a bracket 94, and the annular spring 95 serves to retain this bracket within the casing. The amount of reactance appearing between terminals 85 and 89 is readily increased or decreased by rotation of shaft 87, whereupon a greater or lesser number of turns of winding 83 are included in circuit between terminal 85 and the rotatable contact member 86.

An intelligence-conveying system of the servo type having errors thereof reduced to negligible amounts in conformity with the subject invention is illustrated in Fig. 9. The intelligence input device 96 and output device 97, each having a rotatable member, 98 and 99 respectively, whose angular orientation conveys intelligence, may comprise the conventional input and output elements of a data transmission or control arrangement. In systems of this nature, rotation of the input shaft 98 results in a corresponding rotation of the output shaft 99 by the servomotor 100 coupled therewith. This is accomplished by the transmitter 101, detector 102, and servo amplifier 103. Magnetic rotor 104 of transmitter 101 is rotated with the input shaft 98 and causes voltages which are second harmonics of the frequency of the supply signals impressed across supply leads 105 to be set up in the winding 106 upon the annular stator core of transmitter 101. The electrical detector unit 102 also includes a stator winding 107 which has polycircuit coupling with the transmitter winding 106, whereby diametric second harmonic flux across the annular detector stator core is produced in angular correspondence with the transmitter rotor. Stator winding 107 is also energized by signals impressed across supply leads 105. When the detector rotor vanes 108 are at right angles to the diametric second harmonic flux establishd across the detector stator none of this flux is shunted through the vanes and the central shaft 109, hence the central annular output winding 110 has no second harmonic voltage induced therein. However, divergence of the rotor vanes from this null position in either angular direction results in second harmonic flux traversing them and inducing voltages in winding 110, the phase and amplitude of these voltages being representative of the angular direction and extent of such divergence. Output signals from winding 110 are applied to the servo amplifier 103 which accordingly delivers appropriate signals to the servomotor 100 and causes this motor to align the output shaft 99 with the position in which no output signals are produced by winding 110.

Error compensation in the system of Fig. 9 is achieved in part by a harmonic component compensator arrangement designated by numeral 111 and comprising a polycircuit winding 112 wound about an annular core of saturable material, and fundamental, and third harmonic component compensators such as those illustrated in Figs. 2 through 6 and bearing the same identifying numerals, 24 and 26, respectively. Core winding 112 is tapped at positions corresponding to those of the electrical taps on windings 106 and 107 and is in polycircuit electrical connection with these windings by way of such taps, such that second harmonic voltages created therein will be impressed upon the detector winding 107. Compensation for the second harmonic component of system error is achieved by reactance devices 82 in the polycircuit connections to detector winding 107, these reactances being of the structure shown in Fig. 8 and functioning in the manner explained in connection with the arrangement of Fig. 7.

Second harmonic voltages are generated in the winding 112 of the compensator arrangement 111 as a result of the flow of unidirectional fluxes from the compensators 24 and 26 through the annular core about which the winding 112 is wound during those intervals when the fundamental flux from the winding 112 does not highly saturate the core (not visible in the drawings). These second harmonic voltages are produced in the manner previously explained in connection with the system of Fig. 2. That is, the single pair of magnets in fundamental compensator 24 may be angularly rotated as a unit about the central axis thereof and of the winding 112 such that the pattern of second harmonic voltages produced thereby in winding 112 will have the proper phase relationship with the fundamental component of error to be corrected, and these magnets are rotatable with respect to one another to vary the amplitude of their resultant flux and the second harmonic voltages in winding 112. Similarly, the three pairs of magnets radially spaced from the center of compensator 26 and angularly spaced by 120 degrees are rotatable as a unit about the center of compensator 26 and the magnets of each pair are relatively rotatable, whereby the pattern of fluxes produced by compensator 26, and, hence, the second harmonic voltages in winding 112 for correcting the third harmonic component of system error, are adjustable in phase and amplitude. These second harmonic corrective voltages are impressed upon the detector winding 107 at the tapped positions and create second harmonic flux patterns at the detector which are related to the pattern of error to be corrected in such manner that the detector output voltages will be compensated in accordance with these corrective voltages. That is, the detector output winding 110 produces output voltages which are responsive not only to the second harmonic fluxes set up in the detector by the voltages from transmitter 101, but also by the fluxes set up therein by the voltages from compensator 111. If the detector vanes 108 are at any time aligned exactly at right angles to the diametric flux which would be set up across the detector winding 107 responsive to a given orientation of the transmitter magnets 104 neglecting the effects of the compensators, and this alignment is erroneous because of the system errors, then, with the compensators in circuit, the detector output winding 110 would nevertheless produce an output signal to feed the servo amplifier 103 and excite the motor 100 to drive the shaft 99 and vanes 108 to the theoretically correct angular position. This results because of the fact that the harmonic component compensators cause second harmonic component compensating fluxes to appear at the detector and these fluxes are productive of voltages in the detector output winding 110 which correct for whatever error might be present in the system.

The compass-controlled directional gyroscope system of Fig. 10, in which type of system the subject invention is particularly advantageous, includes a compensating arrangement which does not impress generated second harmonic compensating voltages across the compass transmitter and detector core windings, thereby eliminating the possibility that torques will be introduced by such voltages on the compass transmitter magnet structure which is highly sensitive. Directional gyroscope 113 comprises a rapidly spinning rotor, not shown, mounted in the frame 114 which is pivotally supported in gimbal 115 by trunnions 116. Gimbal 115 is in turn supported pivotally with respect to the outer frame 117 by trunnions 118. Shaft 119 indicates the angular orientation of the gyroscope spin axis by its own angular orientation, which is established by the attached cup gear 120 driven by gear 121 mounted on the gimbal 115. The remote magnetic compass transmitter 122 co-operates with a pair of rotatable magnets 123 which aligns itself with the horizontal component of the earth's magnetic field, and the transmitter toroidal winding 124, excited by fundamental frequency voltages from leads 125, is wound about a saturable annular core. The second harmonic voltages induced in winding 124 by the action of the permanent magnet flux from magnets 123 are applied to the toroidal detector winding 126 at the tapped positions thereof interconnected with the corresponding taps on transmitter winding 124, and second harmonic alternating flux is caused to flow diametrically across the detector winding 126 at angular positions corresponding to the angular orientations of transmitter magnets 123 relative to the transmitter winding 124. Detector rotor vanes 127 conduct such diametric fluxes such that they will induce voltages in the annular output winding 128, the output voltage being a maximum when the vanes are aligned with the diametric flux and zero when the vanes are at right angles thereto. When the supporting aircraft maneuvers to any azimuth heading, this heading is represented by the angular position of output shaft 119 and detector rotor vanes 127, and, if these vanes are not exactly 90 degrees displaced from the diametric flux representing the compass magnet heading, output signals are produced in the detector winding 128 and characterize the extent and sense of this lack of correspondence by their amplitude and phase. These output signals are applied to the phase-sensitive rectifier-amplifier 129 which delivers appropriate direct current excitation to the torque motor windings 130. The fluxes produced by windings 130 interact with the permanent magnets 131 affixed to rotor frame 114 and cause precession of the gyroscope to an azimuth heading at which no detector output obtains.

In the absence of compensator devices, numerous errors of both mechanical and electrical origins may contribute to lack of actual correspondence between the headings of the gyro spin axis and the compass magnets 123, even though the detector outputs may be zero. Compensation for these errors is achieved in accordance with the subject invention by correcting for the first three harmonic components of the over-all system error. Second harmonic component compensation is achieved by adjustable reactance devices 82 inserted into the electrical connections between the compass transmitter and detector. However, fundamental and third harmonic component compensation is accomplished by an arrangement not directly influencing either the transmitter or detector. This arrangement, designated by numeral 132, includes fundamental component compensator 24, third harmonic compensator 26, and a detector unit comprised of a toroidal coil 133 wound on a saturable annular core, detector rotor vanes 134 rotatable with gyro output shaft 119, and an annular output winding 135. The latter detector is similar to the previously described correspondence detector, except that there are no polycircuit connections on winding 133. The effects of compensators 24 and 26 on the compensator detector are the same as the effects discussed in connection with Fig. 9 wherein the compensators influenced the winding 112. However, the second harmonic compensating voltages appearing in detector winding 133 are confined thereto and result in output voltages being set up in the detector output winding 135, these output voltages being of the required values to correct for the fundamental and third harmonic components of system error when applied to the phase-sensitive rectifier-amplifier 129 together with the output of the correspondence detector winding 128. Adjustment of reactances 82 establishes the desired second harmonic component compensation, this being the only component of compensation appearing in the output of detector winding 128. By generating the compensating voltages for the fundamental and third harmonic components of error in the remote compensating arrangement 132, these voltages are available for application to the rectifier-amplifier 129 and yet do not appear in the circuit of the compass transmitter and correspondence detector, in which circuit such voltages might cause misalignment of the compass transmitter magnets 123.

Fig. 11 depicts the compensators 24, 25 and 26 providing error correction for a magnetic compass structure 136. Hereinbefore, the harmonic component compensators have been described as influencing the production of electrical telemetering and control signals, but it should be appreciated that the same principles are applicable to a simple magnetic compass. Structure 136 includes a pair of compass magnets 137 and a compass card 138, the suspension therefore not being illustrated. The field produced by compensator 24 alternately attracts and repels magnets 137 once during a complete revolution of the magnet structure 136, compensator 25 includes at least one soft iron member 35 to which the magnets 137 are twice attracted during the one revolution thereof, and compensator 26 produces three magnetic fields which cause magnets 137 to lead and lag the uncompensated positions three times in any one revolution of structure 136, by virtue of which complete compensation for the first three harmonic components of the error inherent in the compass system may be achieved by proper phase and amplitude adjustment of the compensator units, as earlier described.

It should be apparent from the preceding discussions that compensation for the harmonic components of error in many types of systems may be accomplished by any convenient arrangement of the compensator units with respect to the elements of the system. For example, in those systems including an electrical telemetering transmitter and receiver or detector, certain of the compensators may be associated with the transmitter and the others with the receiver or detector. The arrangement of Fig. 2 may incorporate reactances for second harmonic component compensation rather than unit 25, and soft iron compensator units such as 25 might replace reactances 82 in the systems of Figs. 7, 9 and 10, being positioned in the vicinity of the transmitters in those systems.

Although the preferred compensator units for producing harmonic component compensation have been described in detail, it will occur to those skilled in the art that various modifications and substitutions may be employed to provide compensation in accordance with the teachings of the present invention. For example, fundamental component compensation may be realized by any convenient means, of electrical or mechanical or permanent magnet type, which produces a unidirectional flux of adjustable magnitude and rotatable about an axis of the device the flux is to affect. Also, the third harmonic component compensator may include electromagnets, rather than permanent magnets, and the magnets need not be arranged in pairs but may instead be single magnets varied in distance from the device to be compensated to produce an amplitude adjustment, and only two of the three magnet structures may be utilized to accomplish the compensation.

Therefore, while particular embodiments of this invention have been shown and described herein, these are in the nature of description rather than limitation, and it will be appreciated by those skilled in the art that various changes, modifications and combinations may be made within the province of the appended claims without departing in spirit or scope from this invention in its broader aspects.

What I claim as new and desire to secure by Letters Patent of the United States is:

1. An angular motion translating arrangement comprising at least one rotatable member, the intelligence output of said arrangement being regulated by the angular orientations of said member, a first compensator introducing magnetic flux into said arrangement to correct the intelligence output of said system responsive to the angular positions of said member and in opposite senses and to extents varying as the fundamental harmonic component of the pattern of errors between the actual and theoretically correct intelligence outputs of said arrangement for various angular positions of said rotatable member, a second compensator correcting said intelligence output responsive to the angular positions of said member and in opposite senses and to extents varying as the second harmonic component of said pattern of errors, and a third compensator introducing magnetic flux into said arrangement to correct said intelligence output responsive to the angular positions of said member and in opposite senses and to extents varying as the third harmonic component of said pattern of errors.

2. An angular motion translating arrangement comprising at least one rotatable member, the intelligence output of said arrangement being regulated by the angular orientations of said member, and a plurality of compensator means, responsive to the angular positions of said member, each further regulating the intelligence output of said arrangement in opposite senses and to extents varying in substantially sinusoidal manner as a different one of the first three harmonic components of the pattern of errors between the actual and correct intelligence outputs of said arrangement for various angular positions of said rotatable member.

3. An angular motion translating arrangement comprising at least one rotatable member, the intelligence output of said arrangement being regulated by the angular orientations of said member, and three independently adjustable compensator means, responsive to the angular orientations of said member, each further regulating the intelligence output of said arrangement in opposite senses and to extents which vary in substantially sinusoidal manner as a different one of the first three harmonic components of the pattern of errors between the actual and correct intelligence outputs of said arrangement for various angular positions of said rotatable member.

4. An angular motion translating arrangement comprising at least one rotatable member, the intelligence output of said arrangement being regulated by the angular orientations of said member, and a plurality of compensator means, responsive to the angular orientations of said member, each further regulating the intelligence output of said arrangement in opposite senses and to extents which vary in substantially sinusoidal manner as a different harmonic component of the pattern of errors between the actual and correct intelligence outputs of said arrangement for various angular orientations of said rotatable member.

5. An angular motion translating arrangement comprising at least one rotatable magnetic member, the intelligence output of said arrangement being regulated in accordance with the angular orientations of said member, a first compensator producing a magnetic field interacting with said magnetic member to alternately lead and lag the uncompensated orientations thereof once for one revolution of said member and with substantially sinusoidal variations in direction and magnitude, a second compensator having magnetic material disposed to attract said magnetic member and thereby force it to alternately lead and lag said uncompensated orientations thereof twice for one revolution of said member and with substantially sinusoidal variations in direction and magnitude, and a third compensator producing magnetic fields which interact with and cause said magnetic member to alternately lead and lag said uncompensated orientations thereof three times for one revolution of said member and with substantially sinusoidal variations in direction and magnitude, said sinusoidal variations being, respectively, phased opposite to the fundamental, second harmonic, and third harmonic components of the pattern of errors between the actual and correct intelligence outputs of said arrangement for various angular orientations of said rotatable magnetic member.

6. An angular motion translating arrangement comprising at least one rotatable magnetic member, the intelligence output of said arrangement being regulated in accordance with the angular orientations of said member, and three compensator means disposed to correct the angular orientations of said magnetic member by interaction with the magnetic field thereof to cause said member to alternately lead and lag the uncompensated orientations thereof with substantially sinusoidal variations, said variations being phased opposite to different ones of the fundamental, second harmonic, and third harmonic components of the pattern of errors between the actual and correct intelligence outputs of said arrangement for various angular orientations of said rotatable magnetic member.

7. An angular motion translating arrangement comprising at least one electromagnetic device having a rotor and a stator winding, the intelligence output of said arrangement being regulated by the signal output of said device in accordance with the angular orientations of said rotor, and a plurality of compensators each further regulating the signal output of said electromagnetic device in accordance with the angular orientations of said rotor and opposite senses and to extents which vary as different harmonic components of the pattern of errors between the uncompensated outputs of said device and the outputs thereof required to produce errorless intelligence output of said arrangement.

8. An angular motion translating arrangement comprising at least one electromagnetic device having a stator winding and a rotor, the intelligence output of said device being regulated in accordance with the angular orientations of said rotor, a first compensator further regulating the signal output of said electromagnetic device in accordance with the angular orientations of said rotor and in opposite senses and to extents which vary as the fundamental harmonic component of the pattern of errors between the uncompensated outputs of said device and the outputs thereof required to produce errorless intelligence output of said arrangement, a second compensator further regulating said signal output in accordance with the angular orientations of said rotor and in opposite senses and to extends which vary as the second harmonic component of said pattern of errors, and a third compensator further regulating said signal output in accordance with the angular orientations of said rotor and in opposite senses and to extents which vary as the third harmonic component of said pattern of errors.

9. An angular motion translating arrangement comprising at least one electromagnetic device having a rotor and a stator winding on a core of magnetic material, the intelligence output of said device being regulated in accordance with the angular orientations of said rotor, a first compensator producing a magnetic field which interacts with said device to further regulate the signal output thereof for various angular orientations of said rotor in opposite senses and to extents which vary as the fundamental component of the pattern of errors between the uncompensated outputs of said device and the outputs thereof required to produce substantially errorless output of said arrangement, a second compensator further regulating said signal output in opposite senses and to extents which vary as the second harmonic component of said pattern of errors, and a third compensator producing magnetic fields which interact with said device to further regulate said signal output in opposite senses and to extents which vary as the third harmonic component of said pattern of errors.

10. An angular motion translating arrangement as set forth in claim 9 wherein said electromagnetic device has a permanent magnet rotor controlling the output of signals from said device, and wherein said second compensator comprises magnetic material which distorts the magnetic field from said rotor for various angular orientations thereof such that said signal outputs of said device are changed in opposite senses and to extents which vary as the second harmonic component of said pattern of errors.

11. An angular motion translating arrangement as set forth in claim 9 wherein said stator winding of said electromagnetic device has polycircuit taps thereon electrically intercoupled with corresponding taps on another winding of another electromagnetic device in said arrangement, and wherein said second compensator comprises electrical reactance means in circuit between at least two sets of intercoupled taps of said windings.

12. An angular motion translating arrangement comprising an intelligence input device having a rotatable member, an intelligence output device having a rotatable member, means angularly orienting said output member in accordance with the angular orientations of said input member, and three compensator means each varying the angular orientations of one of said members in angular directions and by angular amounts which vary in substantially sinusoidal manner and with phases opposite to a different one of the first three harmonic components of the pattern of errors between the actual and correct angular relationships between said members for one revolution thereof.

13. An angular motion translating system comprising an intelligence input device having a rotatable member, an intelligence output device having a rotatable member, means angularly orienting said output member in accordance with the angular orientations of said input member, a first compensator varying the angular orientations of one of said members in angular directions and by angular amounts which vary in substantially sinusoidal manner and phased opposite to the fundamental harmonic component of the pattern of errors between the actual and correct angular relationships between said members for one revolution thereof, a second compensator varying the angular orientations of one of said members in angular directions and by angular amounts which vary in substantially sinusoidal manner and phased opposite to the second harmonic component of said pattern of errors, and a third compensator varying the angular orientations of one of said members in angular directions and by angular amounts which vary in substantially sinusoidal manner and phased opposite to the third harmonic component of said pattern of errors.

14. An angular motion translating system comprising an electromagnetic angular motion transmitting device having a permanent magnet rotor and a stator winding on a core of magnetic material, an electromagnetic angular motion reproducing or receiver device having a permanent magnet rotor and a stator winding on a core of magnetic material, said windings being energized by periodically varying current and being electrically intercoupled at a plurality of tapped positions, a first compensator producing a unidirectional magnetic field which interacts with one of said electromagnetic devices to correct the angular deviations between said rotors by angular amounts and in opposite angular directions which vary as the fundamental harmonic component of the pattern of deviations between said rotors for one revolution thereof, a second compensator correcting the angular deviations between said rotors by angular amounts and in opposite angular directions which vary as the second harmonic component of said pattern of deviations, and a third compensator producing unidirectional magnetic fields which interact with one of said electromagnetic devices to correct the angular deviations between said rotors by angular amounts and in opposite angular directions which vary as the third harmonic component of said pattern of deviations.

15. An angular motion translating system as set forth in claim 14 wherein said second compensator comprises magnetic material disposed to intercept the magnetic field from the rotor of one of said electromagnetic devices and to distort said magnetic field for various angular orientations of said rotor such that said field alternately leads and lags the undistorted positions thereof twice and in substantially sinusoidal manner for one revolution of said rotor.

16. An angular motion translating system as set forth in claim 14 wherein said second compensator comprises reactance means in the intercouplings between at least two of the tapped positions on said stator windings of said electromagnetic devices.

17. An angular motion translating system as set forth in claim 14 wherein said first compensator comprises a pair of permanent magnets, means for simultaneously rotating said magnets in opposite angular directions with reference to one another to produce resultant fields of different magnitudes, and means for rotating said pair of magnets as a unit about an axis to vary the angular direction of said resultant fields with reference to said rotor and stator of said one electromagnetic device.

18. An angular motion translating system as set forth in claim 14 wherein said third compensator comprises three pairs of permanent magnets, said pairs of magnets being positioned in substantially one plane and at substantially the same radial distance from an axis of said third compensator, each of said pairs of magnets being spaced angularly by substantially 120 degrees from the other of said pairs about said axis, means for simultaneously rotating the magnets of said pairs with reference to one another to change the magnitude of the resultant fields of said pairs of magnets, and means for rotating said pairs of magnets as a unit about said axis to vary the direction of said resultant fields with reference to said rotor and stator of said one electromagnetic device.

19. An angular motion translating system comprising at least one electromagnetic device having a rotor and a stator winding on an annular core of magnetic material and producing an intelligence output regulating the intelligence output of said system in accordance with the angular orientations of said rotor, a compensator stator winding on an annular core of magnetic material, said stator windings being energized by periodically varying current and being electrically intercoupled at a plurality of tapped positions, a first compensator producing a unidirectional magnetic field which interacts with said compensator winding and core to produce current flows between said intercoupled windings which correct said output of said electromagnetic device by amounts and in opposite senses which vary as the fundamental harmonic component of the pattern of errors between the intelligence outputs of said device and said system for one revolution of said rotor, a second compensator correcting the output of said electromagnetic device by amounts and in opposite senses which vary as the second harmonic component of said pattern of errors, and a third compensator producing three unidirectional magnetic fields which interact with said compensator winding and core to cause current flows between said windings which correct said output of said electromagnetic device by amounts and in opposite senses which vary as the third harmonic component of said pattern of errors.

20. An angular motion translating system comprising an intelligence input device having a rotatable member; an electromagnetic device having a magnetic rotor coupled with said rotatable member and a multi-tapped toroidal stator winding on an annular core of magnetic material; an intelligence output device having a rotatable member; an electromagnetic device for producing signals characteristic of the differences in the angular orientations of said rotatable members, including a multi-tapped toroidal stator winding on an annular core of magnetic material, an annularly-wound output winding, and a rotor coupled with said rotatable member of said output device; a servo motor angularly orienting said rotatable member of said output device in accordance with said output signals from said output winding; a multi-tapped compensator stator winding on an annular core of magnetic material; said stator windings being electrically intercoupled at the tapped positions thereof and being energized by periodically varying current; a first compensator producing a unidirectional magnetic field which interacts with said compensator winding and core to produce current flows between said intercoupled windings which correct the angular orientations of said output member in opposite angular directions and by angular amounts which vary as the fundamental harmonic component of the pattern of errors between the angular orientations of said input and output members for one revolution thereof; a second compensator, including reactance means in the intercouplings between at least two tapped positions of said electromagnetic devices, correcting the angular orientations of said output member in opposite angular directions and by angular amounts which vary as the second harmonic component of said pattern of errors; and a third compensator producing three unidirectional magnetic fields which interact with said compensator winding and core to produce current flows between said intercoupled windings which correct the angular orientations of said output member in opposite angular directions and by angular amounts which vary as the third harmonic component of said pattern of errors.

21. An angular motion translating system as set forth in claim 20 wherein said first compensator is adjustable to produce unidirectional fields of different strengths and to angularly orient said fields in relation to said compensator winding and core, wherein said second compensator reactance means are individually adjustable to produce different reactances to the flows of current between said electromagnetic devices, and wherein said third compensator is adjustable to vary simultaneously the strengths of said unidirectional fields therefrom and to angularly orient said fields in relation to said compensator winding and core.

22. An angular motion translating system comprising a first electromagnetic device having a rotor and a multi-tapped toroidal stator winding on an annular core of magnetic material; an intelligence output device having a rotatable member; a second electromagnetic device producing output signals characteristic of the differences in the angular orientations of said output member and said rotor, including a multi-tapped toroidal stator winding on a core of magnetic material, an annularly-wound output winding, and a rotor coupled with said rotatable member; an electromagnetic compensator device including a toroidal stator winding on a core of magnetic material, an annularly-wound output winding, and a rotor coupled with said rotatable output member; said stator windings being energized by periodically varying current and said stator windings of said first and second electromagnetic devices being electrically intercoupled at the tapped positions thereof; torque motor means angularly orienting said rotatable output member responsive to said output signals from both of said output windings; a first compensator producing a unidirectional magnetic field which interacts with said stator winding and core of said compensator device to produce signals in said output winding of said compensator device which cause the angular orientations of said output member to vary, in angular amounts and in opposite directions, as the fundamental harmonic component of the pattern of errors between the actual and errorless orientations of said output member for one revolution thereof; a second compensator correcting the angular orientations of said output member, in angular amounts and in opposite directions, which vary as the second harmonic component of said pattern of errors; and a third compensator producing unidirectional magnetic fields which interact with said stator winding and core of said compensator device to produce signals in said output winding of said compensator device which cause the angular orientations of said output member to vary, in angular amounts and in opposite directions, as the third harmonic component of said pattern of errors.

23. An angular motion translating system as set forth in claim 22 wherein second compensator comprises reactance means in the intercouplings between at least two of the tapped positions of said stator windings of said first and second electromagnetic devices.

24. An angular motion translating system comprising a magnetic member rotatable under the influence of the earth's magnetic field, and three compensator means each magnetically interacting with said magnetic member to cause said member to alternately lead and lag the uncompensated orientations thereof in a substantially sinusoidal pattern which is of the same amplitude as and phased opposite to a different one of the first three harmonic components of the pattern of errors between the uncompensated angular orientations of said member and the true compass headings.

25. An angular motion translating system comprising a magnetic member rotatable under the influence of the earth's magnetic field, a first compensator establishing a unidirectional magnetic field which interacts with said magnetic member to cause said member to alternately lead and lag the uncompensated angular orientations thereof once for one revolution thereof and in a substantially sinusoidal pattern which is of the same amplitude as and phased opposite to the fundamental harmonic component of the pattern of errors between the uncompensated angular orientations of said member and the true compass headings, a second compensator including low reluctance material to which said member is attracted such that said member alternately leads and lags the uncompensated orientations thereof twice for one revolution thereof and in a substantially sinusoidal pattern which is of the same amplitude as and phased opposite to the second harmonic component of said pattern of errors, and a third compensator establishing three unidirectional magnetic fields which interact with said magnetic member to cause said member to alternately lead and lag the uncompensated orientations thereof three times for one revolution thereof and in a substantial sinusoidal pattern which is of the same amplitude as and phased opposite to the third harmonic component of said pattern of errors.

26. An angular motion translating system comprising a magnetic member rotatable about an axis under the influence of the earth's magnetic field, a first compensator establishing a unidirectional magnetic field near said member and including means for varying the field strength and angular heading of said compensator field about said axis, a second compensator including at least one low reluctance member near said magnetic member and means for varying said low reluctance member in radial distance from and in angular position about said axis, and a third compensator establishing three unidirectional magnetic fields near said magnetic member at substantially equal-spaced angular positions about said axis and at substantially equal radial distances from said axis and including means for simultaneously varying the field strengths and for simultaneously varying the angular positions of said three fields about said axis.

27. In an angular motion translating arrangement comprising at least one rotatable member which regulates the intelligence output of said arrangement in accordance with the angular orientations of said member, a compensator device producing a unidirectional magnetic field which further regulates said intelligence output for various angular orientations of said member in opposite senses and to extents which vary as the fundamental harmonic component of the pattern of errors between the uncompensated and errorless intelligence outputs of said arrangement for various angular orientations of said rotatable member, said compensating device including permanent magnet means and means for adjusting the field strength thereof along a fixed axis to the magnitude which neutralizes said fundamental component of errors, and independently adjustable means for rotatably orienting said magnet means to phase said axis of said magnetic field at the position relative to said member where said fundamental component of errors is neutralized.

28. In an angular motion translating arrangement as set forth in claim 27, the compensator device wherein said permanent magnet means comprises a pair of permanent magnets proximately disposed in substantially one plane, wherein said adjusting means simultaneously rotates said magnets in opposite angular directions to adjust said field strength, and wherein said independently adjustable phasing means rotates said pair of magnets about a second axis.

29. In an angular motion translating arrangement comprising at least one rotatable member which regulates the intelligence output of said arrangement in accordance with the angular orientations of said member, a compensator device producing three unidirectional magnetic fields which further regulate said intelligence output for various angular orientations of said member in opposite senses and to extents which vary as the third harmonic component of the pattern of errors between the uncompensated and errorless intelligence outputs of said arrangement for various angular orientations of said rotatable member, said compensating device including three permanent magnet means, means for adjusting said permanent magnet means to produce three unidirectional magnetic fields extending radially from an axis of said compensator device at positions angularly spaced by 120 degrees about said axis and of a field strength magnitude which neutralizes said third harmonic component of errors, and independently adjustable means for rotatably orienting said magnet means about said axis to phase the angular positions of said fields in the relation to said member where said third harmonic component of errors is neutralized.

30. In an angular motion translating arrangement as set forth in claim 29, the compensating device wherein said permanent magnet means comprises three pairs of permanent magnets, each pair of magnets being equally spaced angularly from the other of said pairs and the magnets of each pair being proximately disposed in substantially the same plane, wherein said adjusting means simultaneously rotates the magnets of said pairs in opposite angular directions with relation to one another, and where said adjustable phasing means rotates said pairs of magnets about said axis.

HARRY C. WENDT.

References Cited in the file of this patent

UNITED STATES PATENTS

| Number | Name | Date |
| --- | --- | --- |
| 2,316,873 | Kollsman | Apr. 20, 1943 |
| 2,375,329 | Sherrill | May 8, 1945 |
| 2,519,058 | Lundberg et al. | Aug. 15, 1950 |
| 2,570,826 | Lundberg et al. | Oct. 9, 1951 |
| 2,581,436 | McCarthy | Jan. 8, 1952 |